3,817,897
CLAY COMPOSITION CONTAINING POWDERED POLYMER

Douglas W. Dill, Racine, Wis., assignor to S. C. Johnson & Son, Inc., Racine, Wis.
No Drawing. Filed Nov. 2, 1972, Ser. No. 303,296
Int. Cl. C08f 45/24
U.S. Cl. 260—29.6 XA   12 Claims

ABSTRACT OF THE DISCLOSURE

A modeling composition having solid ingredients of a dry natural pottery clay and from about 10% to 25% by weight of a powdered polymer such as polyethylene, the powdered polymer being an extremely fine powder having particles no larger than 200 mesh in size. This modeling composition retains all the essential workability properties to allow a broad range of modeling activities while providing the advantage of low temperature baking to fuse it into a tough resistant solid.

BACKGROUND OF THE INVENTION

This invention relates generally to clay modeling and pottery. More specifically, it relates to modeling compositions containing organic material to function as a binder therein.

In standard ceramic practices, articles are formed usually by processes known as hand building, such as coiling and slab construction, or by slip casting, pressing, or throwing on a pottery wheel. In any of these processes, after shaping, the water is allowed to evaporate through drying and the pieces are permanently fused by burning in a kiln at temperatures of from 1200° F. to 2500° F.

The problem facing most amateur potters and modelers is that a kiln is expensive, complicated to operate, and not readily available to most. Kiln time for those not having kilns is expensive, and the necessary delays are aggravating. Accordingly it is desirable to have available a clay composition which can be hardened at a lower temperature such as the temperature available in a household oven, for example, 300° to 400° F. at these temperature levels, ordinary clays will dry out hard but are quickly destroyed by moisture and have little or no impact strength or shock resistance.

There have been attempts in the past to formulate clay compositions which harden at low temperatures. One such attempt resulted in a putty-like product which is a mixture of polyvinyl chloride with various clay compositions. Another such attempt made use of a partially cured phenolic compound. Both of these ideas follow teachings of prior patents such as U.S. Pat. No. 2,288,047 to Sullivan and Austin, which teaches the use of an organic resinous material to allow hardening at a lower temperature.

However, in all such prior teachings, a consequence of obtaining the low temperature bind has been a drastic loss in the workability of the clay. That is, while a clay composition was provided that could be shaped by some means into pottery type figures, it was very difficult or impossible to work with such a composition using classic techniques. For example, it would be difficult or nearly impossible to throw such a composition with a potter's wheel, or to work it in anything resembling the time-tested techniques which amateur ceramic modelers strive to learn.

My invention provides a clay composition which may be hardened at low temperatures, such as temperatures available in home kitchen ovens. Properties of the hardened products are such that it resembles true high-fire ceramics in many ways. Principally, it is water resistant, unlike hardened ceramics which have not been high temperature fused. Further, it is tough and shock resistant. Of principal importance in this invention, however, is that the clay composition of my invention, which may be hardened at low tempertaures, retain the working properties expected of a clay composition by an amateur or professional modeler. In particular, a clay composition made according to my invention is far superior to previously known low temperature baked clay compositions such as those described in U.S. Pat. No. 2,288,047.

The modeling composition of my invention has solid ingredients of dry natural pottery clay and from about 10-25% by weight of a powdered polymer, namely polyethylene, polypropylene, ethylene vinyl acetate copolymer, or mixtures thereof, powdered extremely fine such that the particles are no larger than 200 mesh in size. This composition may be mixed with water to form a moist composition retaining the critical working properties, such as the proper plasticity, which are needed for classic clay-working techniques.

OBJECTS OF THE INVENTION

One object of my invention is to provide a modeling composition overcoming the aforementioned problems.

Another object of my invention is to provide a modeling composition which retains critical working properties of clay and yet may be hard baked at temperature levels available in household kitchen ovens.

These and other important objects will become apparent from the following description and from the examples showing embodiments of the invention.

DETAILED DESCRIPTION OF THE INVENTION

The composition of my invention, in a preferred embodiment, comprises primarily a dry pottery clay and a finely powdered polyethylene. In one preferred embodiment, the dry mixture would consist essentially of 80% dry pottery clay and 20% powdered polyethylene. Water may be added to a blend of the above dry ingredients in an amount sufficient to make a soft paste or a moist mass suitable for modeling and shaping by various means. The same dry mixture may have a greater amount of water added and electrolytes added and such mixture could be poured into molds. The latter process is known as slip casting. In either case, upon baking in a temperature range from 300–400° F., the material hardens forming a tough resistant solid that does not distort or shrink during cure.

My invention is based in part upon the discovery that a very finely powdered polymer, such as polyethylene, polypropylene, ethylene vinyl acetate copolymer, or mixtures thereof, will not impair the working qualities of clay in the indicated levels and yet will give an excellent binding property upon low temperature baking. Extremely fine powdered polymer is a requirement. I have found that from 10–25% by weight of a powdered polymer such as polyethylene, polypropylene, ethylene vinyl acetate copolymer, or mixtures thereof, having particle sizes no larger than 200 mesh, mixed with clay provides a modeling composition which retains the workability of natural clays. Generally, the smaller the particle size the better the working qualities of the final modeling composition. A preferred particle size range requires particles no larger than 400 mesh in size and a most preferred range would have particles no greater than 20 microns in diameter.

The proportion of powdered polymer to the total blended dry composition must fall in the range of 10–25% by weight. A range of from 16–22% of said powdered polymer together with 78–84% of a dry natural pottery clay is highly preferred. If the proportion of powdered polymer exceeds about 25%, the baked ware produced therefrom begins to get waxy and tends to give problems in the application of aqueous glazes, if such is attempted. As the level of powdered polymer drops below 10%, the strength of the baked ware falls off to unacceptable levels.

Referring again to particle size of powdered polymer, when the particle size is larger than about 200 mesh, the natural working properties of clay are not retained, but deteriorate rapidly. From my experiments, it appears that the finer the powdered polymer, the better the working qualities obtainable.

Polyethylene, polypropylene, and ethylene vinyl acetate copolymer, as well as mixtures thereof, may be used in the modeling composition of my invention. The softening points are sufficiently high to be above the temperature of hot tap water to prevent distortion of pieces made with the modeling composition of my invention when they are exposed to hot tap water. The melting points of the above polymers are within the range of from 300–400° F. and therefore their binding effect is achievable in a household kitchen oven.

Any dry natural pottery clay which develops good working qualities when mixed with water can be used in the modeling composition of this invention. Such clays may be made in part from non-plastic clays such as Kaolin and other non-plastic ceramic materials such as pulverized flint, feldspar, and nepheline syenite provided they are blended with very plastic and workable clays such as ball clay or bentonite.

The composition of my invention may be mixed in several ways. A preferred method is the use of a bulk mixer in which the dry clay, water, and polymer are added together. However, the dry ingredients may be blended and then water may be added.

The following examples show several embodiments of the modeling composition of my invention:

EXAMPLE I

A dry blend is made using 80% by weight of a stoneware clay (e.g., Monmouth stoneware clay) and 20% by weight Microthene FN 500 powdered polyethylene (low density), having an average particle size of less than 20 microns and being 10% finer than 400 mesh. After thorough blending, the dry ingredients are mixed with water in a 10:3 ratio by weight to produce a gray plastic clay suitable for hand building or throwing on a potter's wheel. The modeled piece is dried for 3 days and baked for 30 minutes at 300° F. to produce a strong water resistant pottery piece.

EXAMPLE II

A dry blend is made using 90% by weight of a dry clay mixture comprised of 39% ball clay (e.g., Weldon Tennessee ball clay), 48% fire clay (e.g., Missouri fire clay), and 13% 325 mesh feldspar, together with 10% by weight of Microthene FN 510 powdered polyethylene (low density) fine enough to pass through a 325 mesh screen. After thorough blending, the dry ingredients are mixed with water in a 10:3 ratio by weight to produce a moist modeling composition having a buff color. After shaping and drying the article is baked for 30 minutes at 350° F., producing a strong water resistant piece.

EXAMPLE III

Small amounts of electrolyte, specifically soda ash and water glass, are dissolved in water. Then a dry mixture consisting of 75% by weight fire clay (e.g., Cedar Heights fire clay, air floated), and 25% by weight Microthene FN 500, is mixed with the aforementioned solution in a ratio of 2:1 by weight to produce a casting slip with a soupy consistency. This is suitable for pouring in plaster of paris molds. The water is absorbed into the plaster of paris mold allowing the outer portion of the casting slip to thicken. The mold is inverted to pour out the liquid clay remaining in the mold. The stiffened clay is removed from the mold, allowed to dry, and baked at 325° F. for 2 hours. This forms a tough water-proof, shock-resistant pottery shape.

EXAMPLE IV

A dry mixture is made using 79% by weight fire clay (e.g., Cedar Heights fire clay) and 21% by weight powdered polypropylene (e.g., Hercoflat 135) ground so that all particles are 35 microns or less in size. This mixture is added to water in a 10:3 ratio by weight forming a moist modeling clay which after being formed is dried and baked for 60 minutes at 375° F. A tough water-resistant, shock-resistant pottery piece is produced.

EXAMPLE V 22.0% by weight water, 15.6% by weight ethylene vinyl acetate copolymer (e.g., Dylan 3820, a 200 mesh ethylene vinyl acetate copolymer), 46.2% by weight earthen ware clay (e.g., Cedar Heights Red Art clay), and 16.2% by weight ball clay (e.g., Lamkin ball clay) are charged together in a heavy duty Sigma Blade mixer for 10 minutes to form a batch of moist modeling composition. This material is de-aired with a Pug Mill and is suitable for immediate use by amateur potters. The material may be formed, dried, and baked at 350° F. for 30 minutes to form tough water-resistant pottery pieces.

EXAMPLE VI 23.5% by weight water, 7.5% by weight polypropylene (e.g., Hercoflat 135, a 400 mesh polypropylene), 5.0% by weight of a 400 mesh low-density polyethylene (e.g., Microthene NF 500), and 64% by weight fire clay (e.g., Cedar Heights fire clay) are batch mixed in a Baker-Perkins mixer to form a thick, moist modeling composition. After wedging, the composition is used on a potter's wheel to make all types of thrown objects. The objects are dried and baked in a household kitchen oven at 365° F. for 45 minutes. The objects have strength, impact resistance, and water resistance such that, although they can be painted, and decorated, such is not necessary to render them water-proof.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A moist modeling composition consisting essentially of water with a mixture of from 75% to 90% by weight, based on dry ingredients, of a dry natural pottery clay and from 10% to 25% by weight, based on dry ingredients, of a powdered polymer selected from the group consisting of high and low density polyethylenes, polypropylene, ethylene vinyl acetate copolymer having a melting point of from 300 to 400° F., and mixtures thereof, said powdered polymer particles being no larger than 200 mesh in size.

2. The composition of claim 1 wherein said particles are no larger than 400 mesh in size.

3. The composition of claim 1 wherein said particles are no greater than 20 microns in diameter.

4. The composition of claim 1 wherein said mixture has from 78% to 84% of said dry natural pottery clay and from 16% to 22% of said powdered polymer.

5. The composition of claim 4 wherein said particles are no larger than 400 mesh in size.

6. The composition of claim 4 wherein said particles are no greater than 20 microns in diameter.

7. The composition of claim 1 wherein said powdered polymer is low density polyethylene.

8. The composition of claim 7 wherein said particles are no larger than 400 mesh in size.

9. The composition of claim 7 wherein said particles do not exceed 20 microns in diameter.

10. The composition of claim 7 wherein said mixture has from 78% to 84% of said dry natural pottery clay and from 16% to 22% of said polyethylene.

11. The composition of claim 10 wherein said particles are no larger than 400 mesh in size.

12. The composition of claim 10 wherein said particles are no larger than 20 microns in diameter.

References Cited 796,807   10/1968   Canada.

HAROLD D. ANDERSON, Primary Examiner

U.S. Cl. X.R.

260—29.6 R, 26.6 S, 41 R